United States Patent [19]
Evans et al.

[11] Patent Number: 6,061,363
[45] Date of Patent: May 9, 2000

[54] COMMUNICATIONS SYSTEM WITH LOAD SHARING COMMUNICATIONS INTERFACE

[75] Inventors: Stephen Rhylant Evans, Welwyn Garden City; Julian Frank Barry Cable, Bishop's Stortford; Roy Harold Mauger, Radlett; Clive Colin Hayball, Sawbridgeworth; Simon Daniel Brueckheimer, London; Stephen Leonard Fagg; Sarah Lucy Wright, both of Harlow, all of United Kingdom

[73] Assignee: Nortel Networks Corporation, Montreal, Canada

[21] Appl. No.: 08/980,505

[22] Filed: Dec. 1, 1997

[51] Int. Cl.[7] .............................. H04L 12/28; H04J 3/16
[52] U.S. Cl. ........................ 370/467; 370/401; 370/410
[58] Field of Search .................................. 370/401, 410, 370/420, 466, 467, 352, 385, 270, 397, 404, 524

[56] References Cited

U.S. PATENT DOCUMENTS 5,434,852  7/1995  La Porta et al. .................... 370/385
5,623,491  4/1997  Skoog ................................. 370/397
5,712,903  1/1998  Bartholomew et al. ............. 370/401
5,802,045  9/1998  Kos et al. ........................... 370/352

*Primary Examiner*—Chi H. Pham
*Assistant Examiner*—Brenda H. Pham
*Attorney, Agent, or Firm*—Lee, Mann, Smith, McWilliams, Sweeney & Ohlson

[57] ABSTRACT

A number of narrow band networks are interconnected via a broad band network having a signalling protocol different from that or those of the narrow band networks. Calls between terminals associated with first and second narrow band networks are set up by the selection by a call server of a phantom trunk between the networks. This phantom trunk is used to relay the addresses of the two terminals to be connected. By recognizing that two connection requests have been received at opposite ends of the same phantom trunk, a processor in the second network determines that a connection between the terminals via the broad band network is required. Selection of the phantom trunk and sending of address messages is effected via a selected one of a number of identical connection brokers coupled to the call server. The workload of the call server is shared among the connection brokers coupled thereto.

15 Claims, 6 Drawing Sheets

COMMUNICATIONS SYSTEM WITH LOAD SHARING COMMUNICATIONS INTERFACE

This invention relates to arrangements and methods for establishing narrow band connections over a broad band network.

BACKGROUND OF THE INVENTION

Digital telecommunication systems are currently evolving from the so-called first generation of narrow band networks, which are primarily directed to the handling of voice and data traffic, to a new generation of broad band networks which can carry a full range of multimedia services. Within a typical narrow band network, traffic and control information are carried in 64 kbit/s bearer channels using time division multiplexing (TDM). Routing to establish communications channels between end users is determined by the network nodes each of which is provided with a set of routing tables so as to set up an optimum route for each communication. The new broad band networks however are asynchronous in nature and carry traffic in the form of packets of cells each of which incorporates a header containing information whereby the packet is routed by the asynchronous switching fabric. Thus, if narrow band network traffic is to be carried over a broad band network, there is a problem of interfacing the narrow band circuit switched environment with the broad band packet environment. Further, there are differences in signalling protocols between the two types of network, and there is thus a need for a mechanism for carrying the narrow band signalling traffic over the broad band network such that the narrow band signalling remains fully functional.

It will be appreciated that there is currently a large investment in narrow band network systems and there is thus a requirement for interworking between the two types of network such that narrow band traffic can be transported over a broad band network so as to provide end to end connectivity between narrow band network terminals. To achieve this interworking, it is necessary to adapt the narrow band traffic for transmission over the broad band network and to ensure that the narrow band signalling messages are accommodated.

Our co-pending application Ser. No. 08-907521 entitled "System and method for establishing a communication connection" describes an arrangement and method in which a connection broker acts as a single point of contact for the provision of connection services to a call server in a telecommunications network and orchestrates interconnection of first and second narrow band networks. Every request relating to a connection involving any link on the node is constrained to pass through this single entity. This arrangement provides an effective method of interconnecting the narrow band networks. However, we have found that, under conditions of heavy traffic demand, the performance and scale of the node can be limited by the ability of the connection broker to handle all the interactions with the call server. In particular the speed with which a connection may be established and the number of connection requests that may be handled simultaneously are both limited to what can be achieved by a single, monolithic connection broker. Furthermore, as the connection broker represents a single critical item failure of which completely prevents the node from performing its function of establishing communication connections, it is desirable to provide a standby device that can be switched in to service in the event of a failure.

SUMMARY OF THE INVENTION

It is an object of the invention to provide an improved system and method for transporting narrow band traffic over a broad band network.

According to one aspect of the invention there is provided a method of establishing a narrow band communication channel across a broad band network, from a first terminal associated with a first narrow band network node to a second terminal associated with a second narrow band network node, the broad band network having a signalling protocol dissimilar to that or those provided in the respective narrow band nodes, each said narrow band node incorporating a call server having a plurality of substantially identical connection brokers coupled thereto, the method comprising:

at the first narrow band node and on a first communication circuit, receiving an incoming call request from the first terminal, the incoming call request containing an address of the first terminal and a destination address associated with the second terminal;

selecting via a said connection broker at the first node a phantom trunk different from the first communication circuit, the phantom trunk having a circuit identity and being arranged to support a narrow band communication between the first and second nodes;

in a first message, sending the destination address and the circuit identity of the phantom trunk from the first node to the second node;

in a second message, sending the circuit identity and the address of the first terminal to the second node;

identifying via a said connection broker at the second node the presence of the circuit identity in both the first and the second message whereby to establish that the requested communication connection is between the first and second terminals; and establishing the communication connection between the first and second terminals through the broad band network.

According to another aspect of the invention there is provided a telecommunications system comprising a broad band network and a plurality of narrow band network each having a respective node interfaced with said broad band network whereby the narrow band networks are interconnected via the broad band network, the broad band network having a signalling protocol dissimilar to that or those provided in the respective narrow band networks, the telecommunications system being arranged to establish a communication connection between a calling communication device in a first said narrow band network and a receiving communication device in a second said narrow band network; wherein each said narrow band node incorporates a call server having a plurality of substantially identical connection brokers coupled thereto and selection means for means for selecting a said connection broker to orchestrate a said interconnection;

wherein each said call server is responsive to a request message containing the address of the calling communication device and a destination address associated with the receiving communication device so as to identify a circuit identity associated with a first communication circuit used to send the call request to the call server;

wherein each said connection broker is, on selection by the call server, arranged to select a phantom trunk different from the first communication circuit, the phantom trunk having a circuit identity and being arranged to support a narrow band communication between the first and second narrow band networks, the connection broker having means for sending, in a first message, the destination address and the circuit identity from the first narrow band network to the second narrow band network and for sending, in a second message, the circuit identity and the address of the calling communication device to the second narrow band network; and wherein each receiving narrow band node has means for identifying the presence of the circuit identity in both the first and second message to establish that the communication connection is between the calling communication device and the receiving communication device whereby to establish the communication through the broad band network.

According to a further aspect of the invention there is provided a narrow band telecommunications network node adapted to interface with a broad band network whereby to communicate with one or more similar narrow band nodes via communications channels established over the broad band network, said narrow band node comprising a call server having a plurality of substantially identical connection brokers coupled thereto and selection means for means for selecting a said connection broker to orchestrate a said interconnection with a similar node;

wherein said call server is responsive to a request message containing the address of the calling communication device and a destination address associated with the receiving communication device so as to identify a circuit identity associated with a first communication circuit used to send the call request to the call server; wherein each said connection broker is, on selection by the call server, arranged to select a phantom trunk different from the first communication circuit, the phantom trunk having a circuit identity and being arranged to support a narrow band communication between the node and the similar node, the connection broker having means for sending, in a first message, the destination address and the circuit identity from the first narrow band network to the second narrow band network and for sending, in a second message, the circuit identity and the address of the calling communication device to the similar node whereby to establish the communication through the broad band network.

In our arrangement, we provide, multiple identical clones of the connection broker in each node, the connection broker clones being distributed on separate processing elements and simultaneously active. Each connection broker is able to process call server requests relating to connections involving any link on any network adaptor in the node. Each connection broker operates on its own processing element independently of the other connection brokers and communicates with the call server via its own dedicated NCI signalling channel which is not shared with any other clone or function. The call server has equal access to all connection broker clones and is free to direct connection requests to any one clone of its choosing. It is also possible for a single connection to be set-up, modified, and released via different connection broker clones. Each connection broker clone is provisioned with its own identical copy of the terminal number database, but holds no dynamic status information about links on the node. No data is exchanged between the connection broker clones of any one node.

By this selective use of a number of connection brokers at each narrow band node, the volume of fabric control transactions may be evenly shared over the total connection broker processing capacity provided by the sum of all the processing elements available, regardless of the distribution of activity over network adaptors. Full access by the call server to manipulate connections involving all links on all network adaptors is maintained in the event of failure of one or more connection broker processing elements. Further, the functionality of the call server may be readily distributed thus avoiding any risk of a bottleneck in the communications between a connection broker and that call server thus allowing the construction of very large nodes handling high volumes of connection activity.

BRIEF DESCRIPTION OF THE DRAWINGS

An embodiment of the invention will now be described with reference to the accompanying drawings in which.

Figure 1:
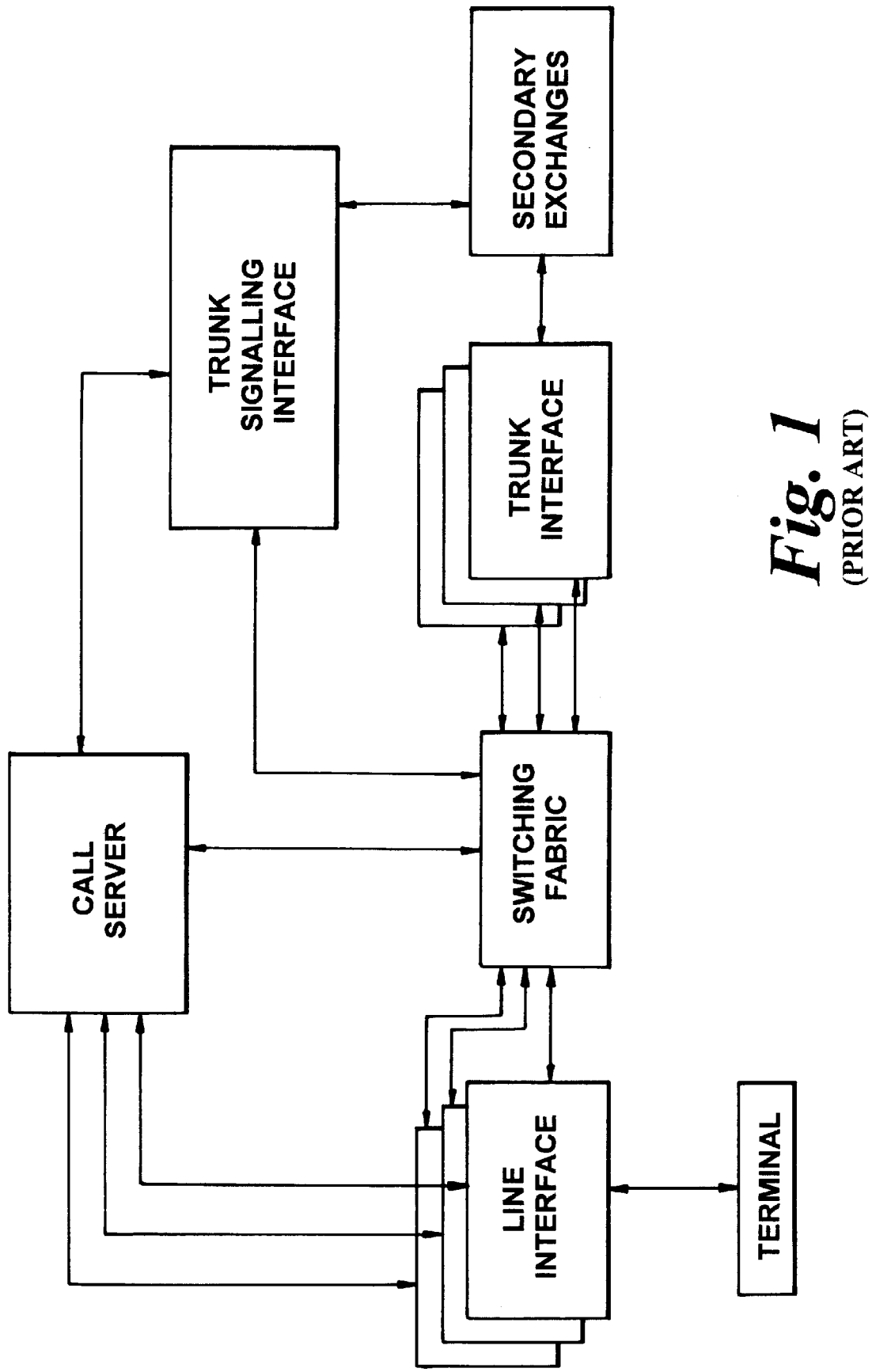
FIG. 1 is a block schematic diagram of a narrow band communications system node.

Referring first to FIG. 1 which is introduced for explanatory purposes, this illustrates a schematic view of a narrow band communications system node 10.

A number of subscriber terminals 12, such as landline telephones or modems, are coupled, typically, to a plurality of line interfaces 14 (although only one need be supplied for an operational system). The line interfaces 14 are each connected to a switching fabric 16 that is arranged to route an input of the switching fabric 16 to an appropriate output thereof, as will readily be appreciated. The line interfaces 14 are also coupled, usually on an individual basis, to a call server 18 arranged to administer and control, for example, the set-up and rear-down of calls across the narrow band network 10. The call server 18 is further coupled to the switching fabric 6. A trunk signalling interface 20, that acts to decode and interpret signalling schemes used within the narrow band network 10, is coupled between the call server 18 and the switching fabric 16. Output from the switching fabric 16 are coupled to a plurality of trunk interfaces 22 (although only one need be supplied for an operational system). The trunk interfaces 22 are further coupled to secondary exchanges 26, such as PBXs or BSSs, within the narrow band network 10.

As will be appreciated, the term "subscriber terminal" is used merely to describe a particular endpoint connection for a line or trunk interface.

User information (traffic) 28–30 enters the narrow band infrastructure via line interfaces 14 or trunk interfaces 22. Control information from individual subscribers enters via the line interfaces 14, whereas control information, i.e. inter-node signalling from connected trunked networks (e.g. the secondary exchanges 26) can enter either via the same trunks as the traffic 30 or through the use of dedicated channel resources (not shown). The call server 18 processes incoming call requests and selects an appropriate outgoing trunk or line, as will readily be appreciated. More particularly, the call server 18 (through the switching fabric 16) controls the connection of specific lines to specific trunks across through the use of fabric control messages 32 that specify the making and breaking of connections between subscriber terminals 12.

While most calls in narrow band systems are two-way, it is helpful to introduce, at this time, the nomenclature associated with one-way connections, namely the connection (TA, TB) refers to the one-way connection from terminal TA to terminal TB while (TB, TA) refers to a complementary (or independent supported) connection in the reverse direction.

Figure 2:
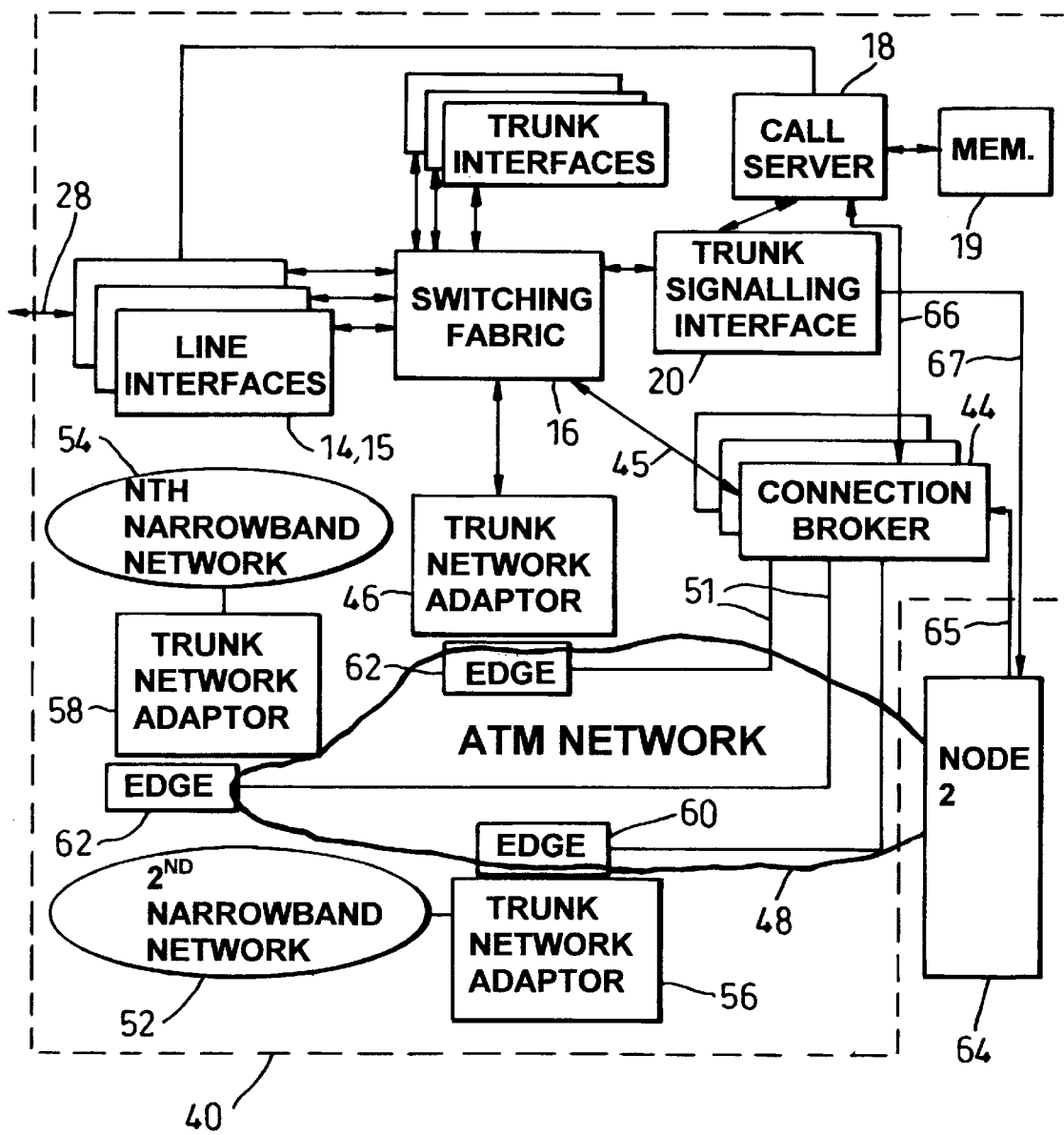
FIG. 2 is a block schematic diagram of a communications system according to an embodiment of the invention providing interconnection between narrow band nodes over a broad band network.

Turning now to FIG. 2, there is shown a block diagram, in accordance with a preferred embodiment of the present invention, of the interconnections of subscriber terminals between narrow band and broadband networks. In this figure, a broadband network generally indicated as 41 is used to transport the user and/or control information. To facilitate an understanding of the architectural differences between the prior art and the preferred embodiment of the present invention, common infrastructure is labelled with identical reference numerals.

At a first narrow band network node 40, a number of subscriber terminals, such as landline telephones or modems (not shown for the sake of clarity), are coupled, typically, to a plurality of line interfaces 14–15 (although only one need be supplied for an operational system) of a narrow band system. The line interfaces 14–15 are connected to a switching fabric 16 that is arranged to route an input of the switching fabric 16 to an appropriate output thereof. The line interfaces 14–15 are also coupled (usually on an individual basis) to a call server 18 arranged to administer and control, for example, the set-up and tear-down of calls across the narrow band network. The call server is coupled to a memory 19 that is arranged to store, amongst other things, circuit indicators codes (CICs) associated with both real trunks and phantom trunks. More particularly, the memory can record a "busy" or "vacant" status against each of these real or phantom trunks. The call server 18 is further coupled to a plurality of substantially identical connection brokers 44, which in turn are coupled to the switching fabric 18 via bus 45. The connection brokers 44 can be considered as clones each of which operates in an identical manner to handle narrow band connections across the broadband network. The use of the connection brokers 44 represents a significant departure in the system architecture of the preferred embodiment of the present invention from that of prior art FIG. 1. A trunk signalling interface 20, arranged to act to decode and interpret signalling schemes used within the narrow band network, is coupled between the call server 18 and the switching fabric 16. Outputs from the switching fabric 16 are coupled to a plurality of trunk interfaces 22–24, (although only one need be supplied for an operational system. The plurality of trunk interfaces are again coupled to secondary exchanges(not shown for the sake of clarity), such as PBXs or BSSs, within the narrow band network.

The switching fabric 16 is further coupled to a first trunk network adaptor 46 that allows interconnection and interoperability of the narrow band network with a broadband network 48 implemented, for example, as asynchronous transmission mode (ATM) operation. More particularly, interconnection of the trunk network adaptor 46 is through a broadband network edge switch 50, that is coupled to and hence controlled by the connection broker clones 44 by control lines 51. The combined function of the trunk network adaptor 46 and the broadband network edge switch 50 will be described subsequently. Other narrow band networks 52–54 are coupled, in a similar fashion, to the broadband network 48 via respective trunk network adaptors 58–60 and broadband network edge switches 60–62. As will be appreciated, other narrow band networks 52–54 will be realised through infrastructure architectures similar to that described immediately above.

The broadband network 48 is further coupled to a second node 64, typically a different network, which is also responsive to the connection broker clones 44 via connection 65. The second node 64 is also arranged to be in communication with the trunk signalling interface 20 via communications bus 67. Additionally, as will be understood, the broadband network may support point-to-point broadband communications, such as video telephony between subscriber terminals (not shown).

As will be appreciated, the terms node and exchange are interchangeable and are used to describe stand-alone networks, e.g. distinct narrow band networks operated by different operators.

According to the preferred embodiment of the present invention, narrow band signalling within the communication system, generally, is controlled by the call server 18, while broadband signalling, i.e. signalling that may be sent between different narrow band networks 52–54 via the intermediate broadband network 48, is controlled by the connection broker clones 44. Consequently, the call server 18 is not itself concerned with broadband signalling interconnection and operation.

According to the present invention, therefore, the narrow band line interfaces 14–15, trunk interfaces 22–24 and switching fabric 16 are supplemented by a broadband network 48 and trunk (i.e. narrow band/broadband) network adaptors 46, 56–58 that act to provide gateway functionality. Specifically, the trunk network adaptors 46, 56–58 perform traffic (user information) inter-networking functions and signalling (control information) encapsulation, with the signalling ultimately relayed back to a call server 18.

A principal feature of a preferred embodiment of the present invention is the new function performed by the connection broker clones 44, which function is used to provide a uniform connection abstraction 66 for the call server 18, independent of whether the connection crosses (and is retained entirely within) the narrow band network or the broadband network, or in the case where the connection crosses both the narrow band and broadband networks. This necessitates use of a uniform terminal name space identity (i.e. a standardised address format) for all terminals across the entire communication system, i.e. both narrow band and broadband systems.

For a narrow band to narrow band connection in a single narrow band network (e.g. owned by a particular operator), each connection broker clone 44 passes the connection messages to the switching fabric 16 of the narrow band network then establishes the connection in accordance with known techniques, and does not utilise the broadband network 48. For a broadband to broadband connection, each connection broker clone 44 instructs the broadband network and/or trunk network adaptors 46, 56–58 to make or break a call connection, and therefore mimics standard broadband operation.

For a narrow band to broadband connection, however, both actions must be performed contemporaneously. Specifically, each connection broker clone 44 both instructs the switching fabric 16, through the call server 18 in the narrow band network, to hold open a routing path for a call and negotiates with a trunk network adaptor 46 of the broadband network for the allocation of a suitable channel resource. Once both paths have been determined, the respective connection broker clones 44 send dedicated messages to the switching fabric 16 and the trunk network adaptor 46 to establish the connection. This achieves the connection abstraction as seen by the call server.

In an operational communication system, compatibility between operators is desirable, if not essential. As such, establishing an interconnection (usually termed a "gateway"), between different "mixed nodes" is a significant issue. In this context, the term "mixed nodes" is used to describe different networks, operated by different operators, that each typically have switchable narrow band/broadband capabilities and defined service capabilities. However, intermediate broadband networks may not be able to support these services (or any service of similar nature) not be to interpret narrow band control channel signalling required to set up a define narrow band services, i.e. there are different signalling protocols between the different adjacent exchanges. Therefore, a preferred embodiment of the present invention provides a mechanism for establishing interconnection of narrow band networks through an intermediate broadband network to assimilate the narrow band control channel signalling regimes and format. In this case, the interconnection of the narrow band networks (through the intermediate broadband network 48) requires the functional coordination of separate call servers and connection brokers located in the respective networks.

Figure 3:
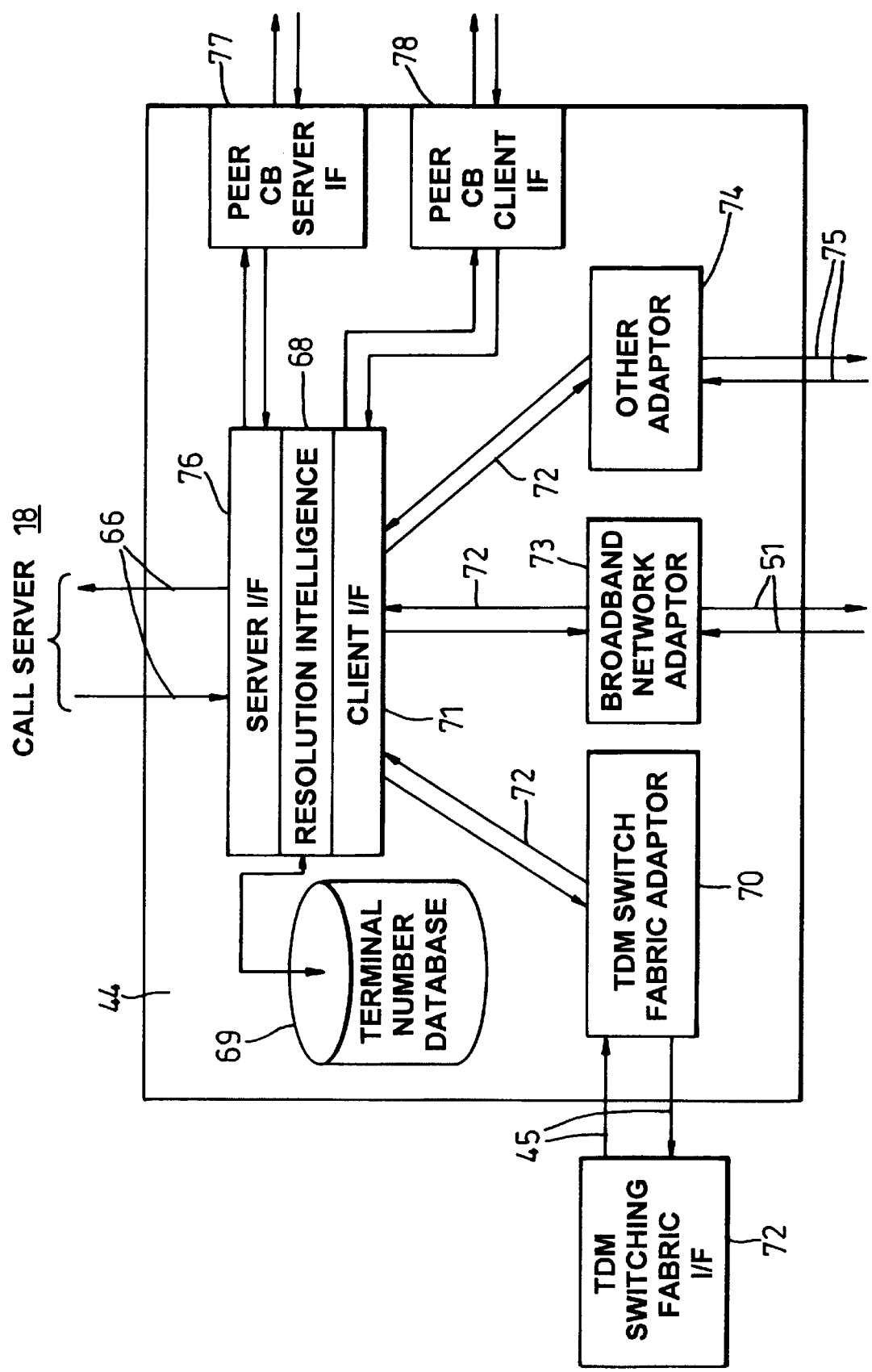
FIG. 3 illustrates the architecture of a connection broker clone employed in the communications system of FIG. 2.
Figure 4:
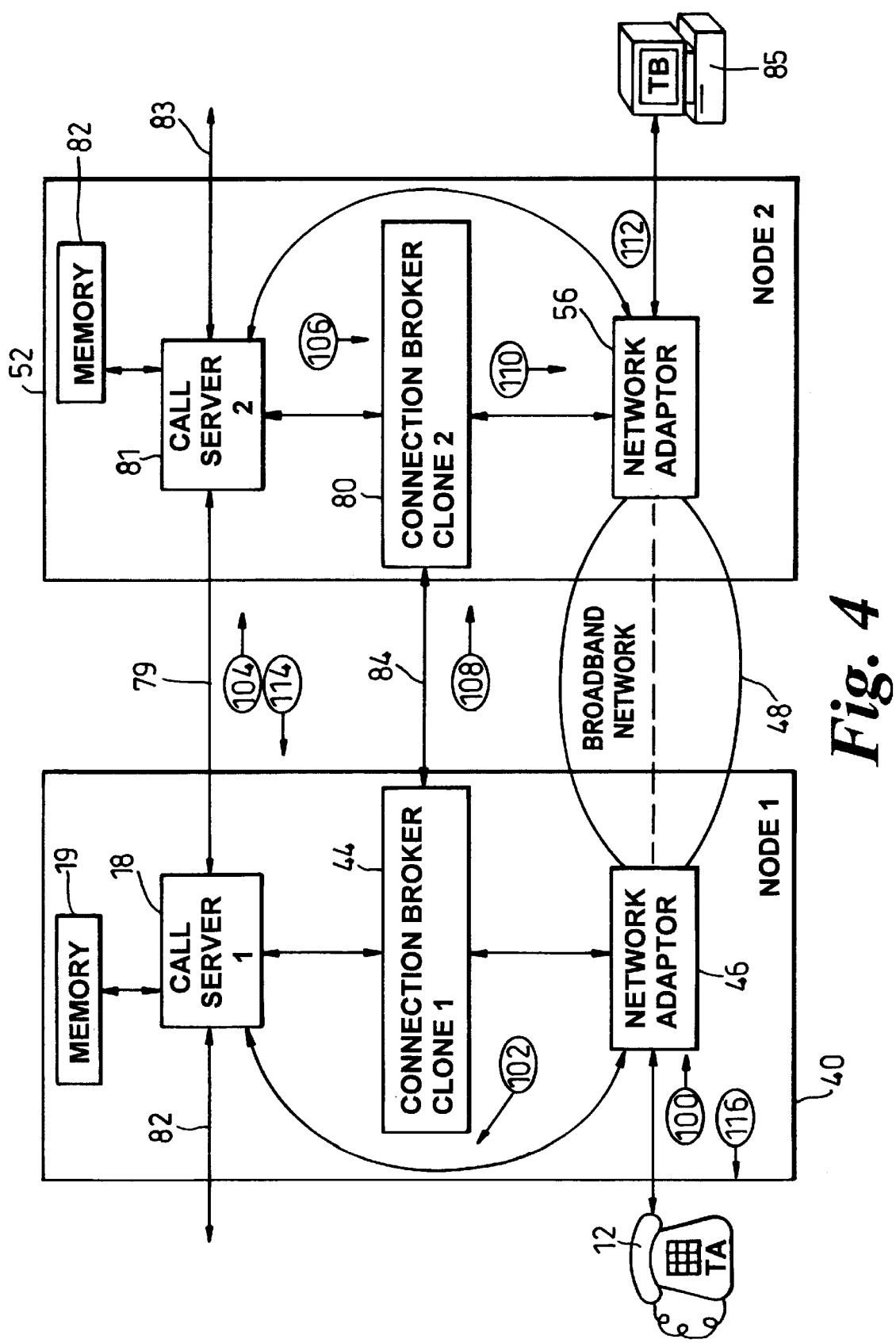
FIG. 4 is a schematic diagram illustrating the operation of the communications system of FIG. 2.

Turning now to FIG. 3, an abstract architecture for a connection broker clone 44 of a preferred embodiment of the present invention is shown. Although a hardware implementation is dependent upon (and hence determined by) by specific requirements, a typical implementation extends the capabilities of an existing, prior art narrow band telephone exchange. By way of example and explanation only, the connection broker clone 44 of FIG. 3 contains resolution intelligence 68 that typically realised as a processor. The function of the resolution intelligence 68 will be described subsequently. A terminal number data base 69 that maps the uniform terminal numbers onto network-specific location addresses is coupled to the resolution intelligence 68. A time division multiplexed (TDM) switch fabric adaptor 70 (in the case of a TDM narrow band system) provides protocol conversion between the resolution intelligence 68 (via a client orientated interface port 71) and a TDM switching fabric interface 72 (analogous to the switching fabric 16 of FIG. 2). Typically, a dedicated connection protocol 72 is utilised between the resolution intelligence 68 and the TDM switching fabric adaptor 70, although this need not be the case. A broadband network adaptor 73 is also coupled through the client interface port 71 to the resolution intelligence 68, with communication between the resolution intelligence 68 and broadband network adaptor 73 typically based on the dedicated connection protocol 72. The broadband network adaptor is analogous to the trunk network adaptor 46 of FIG. 2. Other adaptors 74 for ancillary networks or services may also be coupled to the resolution intelligence 68 via the client interface 71. The broadband network adaptor 73 and the other adaptors 74 will accordingly be respectively coupled to the broadband network edge switch 50 via control lines 51 or appropriate communication resources 75. The resolution intelligence is also coupled to a server interface port 76 that provides an interconnection facility, via lines 66, to call server 18. The server interface port is also coupled through a secondary port 77 (termed a "peer connection broker server interface") arranged to interconnect the resolution intelligence 68 of the connection broker 44 to another connection broker as shown in FIG. 4. Note that, for clarity, only one connection broker clone and only one network adaptor are shown in each node in FIG. 4. Similarly, the client interface port 71 (FIG. 3) is also coupled to a ternary port 78 termed a "peer connection broker client interface") arranged to couple the resolution intelligence 68 of the connection broker 44 to a subscriber terminal principally connected to another connection broker (as shown in FIG. 4).

Prior art telephone exchanges typically have a distributed processing architecture with multiple fault-tolerant processors and an interprocessor communications facility, while the switching fabric may be supported by a special purpose processor, as will be understood.

In the preferred embodiment of the present invention, each connection broker clone 44 supports a set of real-time processes within a single fault tolerant processor, i.e. within the resolution intelligence 68. The inter-processor communications facility (supported by the dedicated connection protocols 72) of the connection broker clone 44 is used to communicate with the switching fabric 16 and the call server 18. As has previously been described, each connection broker clone may use the interprocessor communications facility to access the broadband interfaces on the trunk network adaptors. However, as communication networks evolve to be more broadband orientated, the call server 18 and the associated connection broker clones 44 may reside on processors with only broadband interfaces that are connected directly to the broadband network 48. The narrow band connection fabric would then be provided with a broadband control interface.

A system architecture and associated mechanism by which a preferred embodiment of the present invention connects subscriber terminals across an intermediate broadband network is shown in FIG. 4. In order for a data call, for example, to be supported between terminal TA (e.g. a land line telephone identified by reference numeral 12) on a first node 40 and terminal TB (e.g. a modem within a computer, identified by reference numeral 85) on second node 52, the preferred embodiment of the present invention utilises the existence of a common signalling relation between both narrow band nodes. It is the establishment of a common narrow band signalling link (or resource) 79 and protocol that is essential to the system of the present invention; the broadband network need only have the capability of relaying traffic between the narrow band networks. The broadband network consequently appears as a transparent channel resource since no modification of the narrow band traffic is required.

The first node 40 and the second node 52 both contain trunk network adaptors 46, 56, connection broker clones 44 and 80, and call servers 18 and 81 which are coupled permanently together over the common narrow band signalling link 79 that provides a plurality of virtual (or "phantom") traffic trunks. The call servers 18 and 81 are therefore potentially connected to other call servers (not shown) of different narrow band networks (not shown) by additional signalling resources 82–83. The call servers 18 and 81 are respectively coupled to connection broker clones 44 and 80, which in turn are coupled to respective trunk network adaptors 46 and 56. The trunk network adaptors 46 and 56 are coupled together through a broadband network 48, while the connection broker clones 44 and 80 are interconnected by a virtual link 84. Terminal TA 12 is coupled to trunk network adaptor 46, while terminal TB 85 is coupled to trunk network adaptor 56.

In a preferred embodiment of the present invention, the signalling link 79 is realised a permanent connection between the two call servers 18 and 81, although this connection may be dynamically assigned or provided by a radio frequency link. Indeed, in a scenario where the first node 40 and second node 52 pre-exist as narrow band gateway nodes between network A and network B, real narrow band E1 trunks already exist between these two exchanges and, as such, signalling can be carried in a time-slot of those E1 trunks, i.e. conventionally in time-slot sixteen. Alternatively, in a North American-based system, the two different exchanges could be connected to a common STP network. Once the broadband network 48 is in place, however, supplementary signalling bandwidth can be supported by establishing links through the broadband network. Nonetheless, these multiple paths represent a single logical "signalling relation" by which SS7 user parts (i.e. the call servers) are able to communicate and interact.

The virtual link 84 established between the two connection broker clones 44 and 80 offers a permanent "ability to communicate". In a preferred embodiment, the virtual link 84 therefore takes the form of an ATM virtual channel connection. However, it is also possible for an SS7 network to be used as the bearer for this communication, e.g. in relation to a TCAP application. The communication links between the connection broker clones 44 and 80 and both the network adaptors 46, 56 and the switching fabrics are also permanent, while connections that carry traffic between the network adaptors 46, 56 and the interconnected subscriber terminals TA 12, 85 are made and broken for the duration of a specific call or for particular portions of those calls.

The system of the preferred embodiment of the present invention operates by virtue of the provisions of at least two (and probably tens to thousands of) assignable signalling channel resources or "phantom trunks" between the respective switching fabrics, principally residing between the respective calls servers 18 and 81 and respective connection broker clones 44 and 80. The nodes then utilise narrow band signalling to simulate the presence of virtual (or "phantom") terminals at either node. The preferred embodiment of the present invention considers that these phantom trunks are dedicated to a single node and, as such, only allow the formation of a call in one direction from the first node 40 to the second node 52 or vice versa. Thus, a phantom route between the two nodes consists of two undesirable effects which could otherwise occur if the same phantom trunk was seized by each node trunk are prevented. Beneficially, the phantom trunks do not tie up real communication resources that exist between the respective narrow band networks.

Figure 5:
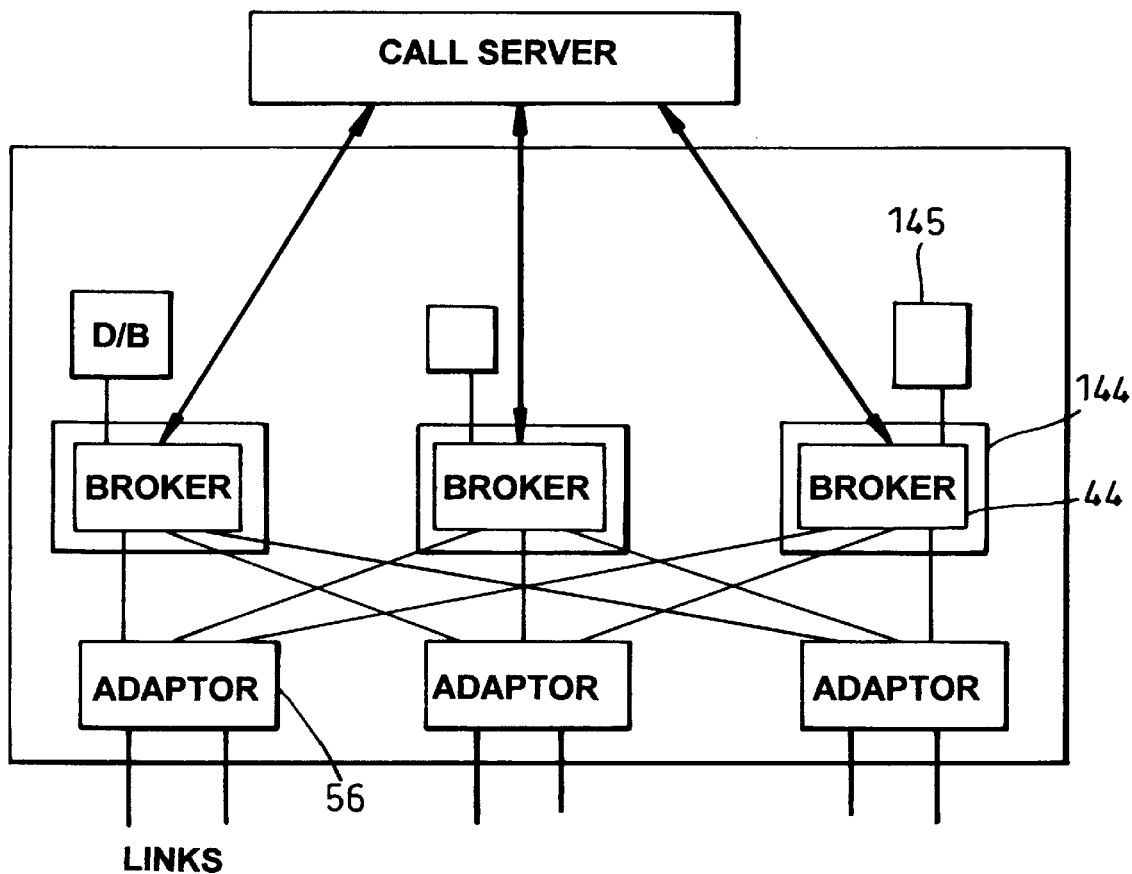
FIG. 5 is a refined extract of FIG. 3, showing the relationships between multiple connection broker clones and the other elements of a node.

Referring now to FIG. 5, this illustrates the configuration of connection broker clones within a narrow band node. As shown, each connection broker 44 is associated with a respective processing element 144, a terminal number database 145 and a network adaptor 56. A mesh interconnect is provided between the connection brokers and the network adaptors such that each connection broker can use any network adaptor to establish a connection. Selection of a connection broker to handle a connection is effected in a number of ways. Typically, the call server selects connection brokers on either a random basis or a sequential basis so as to spread the work load among the connection brokers. Alternatively a 'round robin' system of selection may be employed. On receiving a connection request, the selected connection broker clone performs the following functions.

1. It accesses its local copy of the terminal number database 145 to identify the network adaptor or adaptors involved in the connection.
2. It passes appropriate commands to those network adaptors instructing them to perform the actions required to handle the connection request.
3. It receives from the network adaptors their responses to those commands, and formulates from these responses an overall response which it then communicates to the call Server via the associated NCI signalling channel.

Within a node, the connection broker clones 44 operate substantially independently of one another. Each utilises its own respective processing element 144 so that all connection broker clones within a node operate simultaneously in parallel. There is no communication between connection broker clones within a node, and no status information is retained concerning a connection request once the response has been returned to the call server.

Failure of a connection broker clone 44, or of the processing element 144 on which it runs, results in loss of communication on the associated NCI signalling channel. The call server is responsible for responding to this condition by refraining from directing any connection requests over the NCI signalling channel concerned until communication with that connection broker clone is re-established. While one or more connection broker cones is/are unavailable, all connection requests are divided, by the call server, between those connection broker clones which are still fully functional. This may slightly reduce the performance of the node in terms of the volume of connection requests it can process in a given time, but will not restrict the range of links or network adaptors that can be involved in connections.

Failure of a connection broker clone, the processing element on which it runs, or the communications link carrying the NCI Signalling Channel between it and the call server during the processing of a connection request, could also leave the call server unsure if the request has been actioned or not. This can be resolved by the call server repeating the request via a different connection broker clone on expiry of a time-out in the event that the originally selected connection broker clone's response is not received. Each Network adaptor 56 retains the definitive view of the current status of all connections involving its links, and receiving an instruction to set a link into a state which it already occupies is not regarded as indicating a fault.

To increase the connection request capacity and performance of a Node it is only necessary to introduce additional, identical, connection broker clones on additional processing elements, each with their own corresponding NCI signalling channel. No modification to existing connection broker clones is required. Increasing the number of connection broker clones reduces the time needed to handle each connection request, increases the number of connection requests that may be processed simultaneously, and reduces the impact on the node's performance of any failure of a connection broker clone or of an associated processing element.

Figure 6:
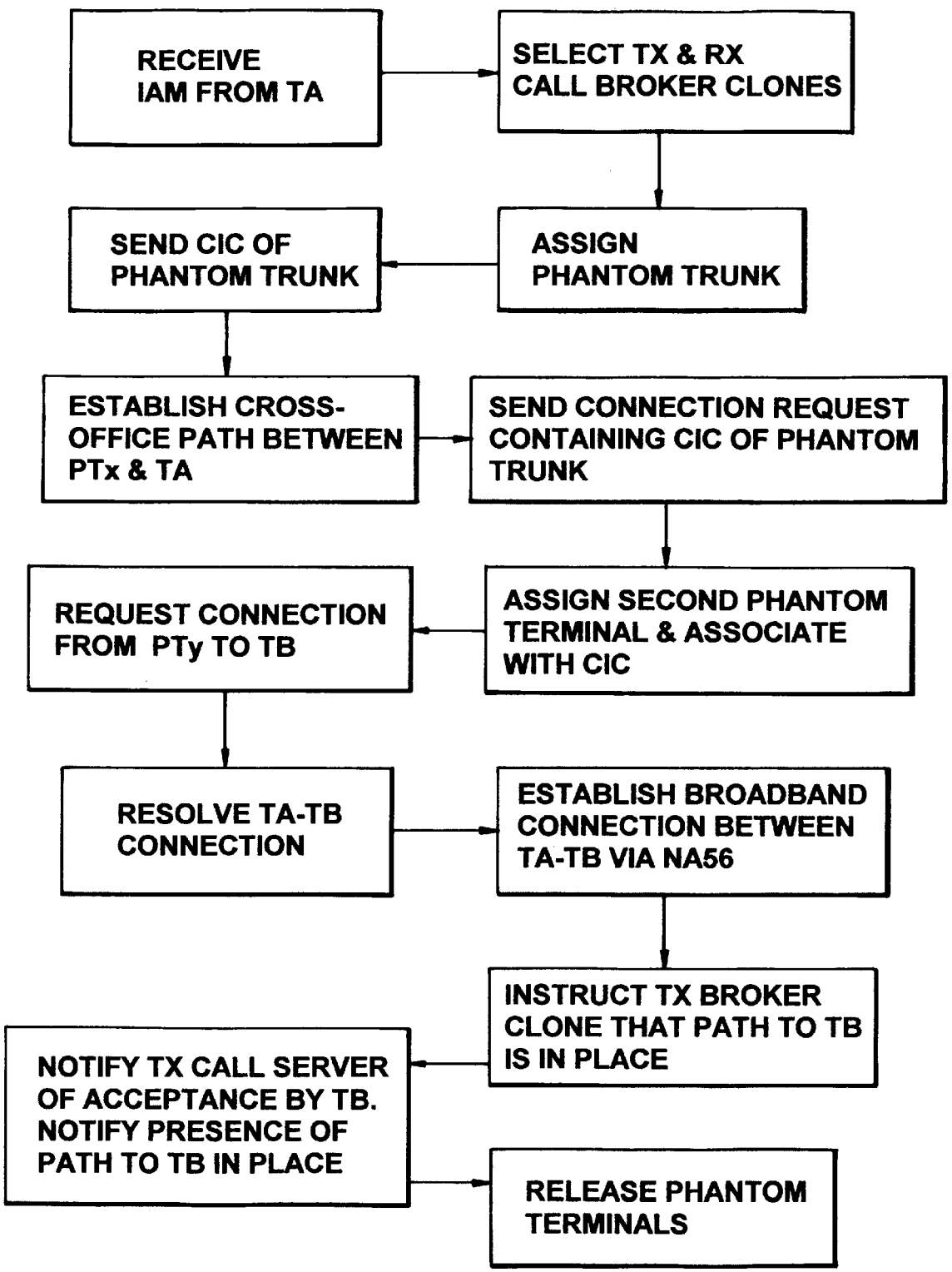
FIG. 6 is a flow chart illustrating the setting up of a multinode narrow band connection in the communications system of FIG. 2.

In relation to the structure, content and function of call set-up messages between difference exchanges (i.e. different nodes), this can best be understood with reference to FIG. 4, the flow diagram of FIG. 6 and the subsequent tabulated summary of message functions.

An incoming call (or "initial address message", IAM) from terminal TA is received 200 at the first node 40, whose call server 18 receives the incoming message and determines that the call must be routed to the second node 52. The incoming call will at least contain a CIC relating to the trunk assigned between TA and the call server 18 together with a telephone number of the called party, namely TB in this example. The telephone number does not otherwise provide any indication of a port address to be used by TB in any subsequent communication and therefore principally acts to provide a routing instruction for use by the call servers. As such, the telephone number merely represents an address location of TB, although it may need to be subsequently transposed in order to arrive at a valid cross-node address.

In response to receipt of the incoming call and to save real communication resources (i.e. real communication links that can supports 64 kbps speech, for example), the first call server 18 selects a free phantom terminal PTx and then uses this phantom terminal to establish 202 a phantom trunk between itself and a second call server 81 located in second node 52. Indeed, the call server 18 selects an available, node-unique ("disjoint") address field indicative of the free phantom terminal PTx from its associated memory 19. The free phantom terminal PTx, in fact identifies a terminating address of the phantom trunk.

Typically, a phantom terminal identity is comprised from point codes associated with the two call servers 18, 81 and the CIC of the phantom trunk. In this instance, ordering of the point codes of the two call servers will identify a relative direction for the communication.

The first call server 18 then utilises the phantom trunk to relay 204 a modified call message (to the second call server 81 of the second node 52) comprised from a CIC associated with the phantom trunk together with the valid telephone number of TB. The second call server 81 is therefore able to utilise the telephone number of TB to "wake-up" or alert TB to the fact that there is something in the communication system that will be of interest to TB, albeit that TB is yet to receive any meaningful information. Unfortunately, at this time, the CIC pertaining to the connection between TA and the first call server 18 has been "lost" to the second node 52 since it is neither communicated nor encoded with the modified call message. In other words, the call server 18 of the first node 40 notifies the call server 81 of the second node 52 about the incoming call 100 by sending 104 a modified incoming call message on a phantom trunk, and thus passes on the dialled digits (i.e. the address of the called party) received from TA.

Furthermore, in response to the incoming call 100, the allocated connection broker clone 44 of the first node 40 is arranged to establish 206 a phantom cross-office path between PTx and TA, with information pertaining to this cross-office path typically stored in the terminal number data base 69 by the resolution intelligence 68. In other words, terminal TA is coupled to phantom terminal PTx. Also, the preferred embodiment of the present invention is arranged such that the first connection broker clone 44 is triggered into action by the communication of the modified call message (to the second call server 81). Specifically, substantially contemporaneously with the sending of the modified call message, the first connection broker clone 44 of the first node 40 notes that the phantom terminal PTx is one end of an outgoing phantom trunk to the second node 52. The first connection broker clone therefore passes 208 a connection request 106 to a second connection broker clone 80 at the second node 52 via virtual link 84, which connection request contains the CIC of the phantom trunk and the identity of TA (possibly derived from the original CIC assigned to the trunk between TA and the first call server 18). In the preferred embodiment, though, the actual address of the call-originating unit, i.e. TA, is sent.

The second node 52 reacts to the modified incoming call message (received on the phantom trunk) by mapping 210 the received circuit indicator code (CIC) of the phantom trunk onto an associated second phantom terminal Pty. Again, the second phantom terminal Pty has been selected by the second call server 81 of the second node 52 from its associated memory 82, with the memory up-dated to record that Pty represents a terminating point of the phantom trunk. Selection of the phantom terminal Pty is on a unique basis.

The second node 52, in response to the second call server 81 receiving the modified incoming call message, already appreciates that the destination of the incoming call ultimately lies with terminal TB. Therefore, at an appropriate time, the second call server 81 requests 212 a connection from TB to the second phantom terminal Pty (in the form of a second phantom cross-office path request between the phantom trunk and the called subscriber TB), and offers the incoming call request to TB using conventional signalling.

Furthermore, the resolution intelligence of the second connection broker 80, in response to receiving (in any order) both requests resolves out 214 the two phantom terminals PTx and Pty, converting the two requests "Connect TA to PTx" and "Connect TB to Pty" into the single real connection request "Connect TA to TB". Specifically, the second connection broker clone 80 is able to deduce the fact that there is a common CIC for the phantom trunk, and so the requirement for a direct connection between TA and TB is identified by virtue of this commonality. The second connection broker clone 80 then makes an actual trunk connection 216 between TA and TB via the second trunk network adapter 56. At about the same time, the second connection broker clone 80 (of the second node 52) instructs 218 the first connection broker clone 44 (of the first node 40) that the path to TB is in place.

Acceptance by the terminal TB of the call, and confirmation of the connection by the second connection broker clone 80 is notified from the second call server 81 to the first call server 18, and the first connection broker clone 44 also notifies 116 its associated call server 18 that the path to TB is in place. At this point 220, the first call server 18 may start billing the call.

The phantom trunk remains intact for the whole duration of the call, with tear down of the broadband connection operating in a complementary sense to the call set-up procedure described in detail above. The skilled addressee will appreciate that to clear-down a broadband call, the call servers may clear a call using standard procedures for a narrowband (or SS-7) communication, as will readily be appreciated. Particularly, as part of this procedure, both call servers will issue request to their respective connection brokers. Thereafter, the connection broker clone at the outgoing end of the phantom trunk will pass its release request onto the other connection broker clone by sending the CIC of the phantom trunk. The terminating connection broker clone will issue a clear-down of the broadband connection on receipt of whichever of the two messages it receives first. It is noted that the phantom trunk is not re-usable until both call severs have been told (by their respective connection broker clones) that the broadband connection has cleared.

The functions performed by the principal message signalling are summarised in the table immediately below:

| Message | Function | Content |
| --- | --- | --- |
| 100–102 | Incoming Call | Identifies address of destination terminal and initial CIC to TA. |
| 104 | IAM | On selected phantom trunk, first connection broker clone 44 send modified incoming call message containing destination code (CIC) for phantom trunk/phantom terminal PTx. |

-continued

| Message | Function | Content |
|---|---|---|
| 106 | Connection Request | Second node maps phantom trunk CIC onto associated phantom terminal Pty. Second call server receives real terminal number for TB and connection attributes, such as bit-rate, coding, etc. |
| 108 | Connection Request | First connection broker clone send phantom trunk CIC, real terminal number for TA and connection attributes to second connection broker clone. |
| 110 | Broadband Connection Request | For proxy signalling, use a proxy signalling link for BA 56. Include a destination broadband network address (NSAP) for TA and the VPI/VCI for TB, together with connection attributes. |
| 112 | Ringing? | Message from the second call server indicating incoming call to TB. May contain OLI, etc. |
| 114 | ANSwer | CIC |
| 116 | answer | TA may get this in-band |

It will be understood that the above description of a preferred embodiment is given by way of example only and that various modifications may be made by those skilled in the art without departing from the spirit and scope of the invention.

As will be understood, an exemplary address format for each phantom terminal is typically arranged to be a special case of the format used for real (i.e. physical rather than imaginary) terminals. As such, a preferred embodiment of the present invention uses an ASN.1 Object Identifier to identify phantom trunks. Alternatively, a partitioned E.164 address or a superset of E.164 may be utilised, while for a simple SS7-based implementation the tuple (OPC, DPC, CIC) can uniquely identify a trunk (whether real or phantom). However, as will be appreciated, another scheme is needed for non-SS7 terminals, such as telephones. For example, the CI field could be extended to 32 bits (rather than the normal 16 bits) and DPC can then be equated to OPC to identify a "line" type of terminal while the CIC can be used to identify the line on the exchange. Generally, however, the only requirement for establishing a phantom trunk is for the connection broker clone to appropriately tag and record (in the terminal number data base 69) such a phantom trunk as either incoming or outgoing.

Turning again to the general architecture of FIG. 2, a particular embodiment of the present invention utilises an ATM network and the International Telecommunications Union, Telecommunications Section (ITU-T) signalling system No. 7 to implement the broadband network and narrowband control signalling, respectively.

Particularly, a narrowband node utilises the ISDN User Part (ISUP) of ITU-T Signalling System No 7 to communicate with other exchanges (e.g. narrowband network 52) to support multi-node operation. The exchange terminates some narrowband lines directly and terminates narrowband trunks via trunk network adapter 46 connected to an Asynchronous Transfer Mode (ATM) network 48.

The trunk network adapter 46 translates bearer channels to an ATM scheme, with a one-to-one relationship existing between each bearer channel and an ATM virtual channel (VC). Typically, the broadband network edge switches 50, 60–62 and hence the trunk network adapters 46, 56–58 are connected to the ATM network 48 using ATM Forum User to Network Interface (UNI) version 4.0 interfaces for the traffic bearer channels and the control lines 51, while the connection brokers establish Q.2931 connections 51 to trunk network adapters 46, 56–58 using the proxy signalling option of UNI 4.0.

Narrowband signalling to other exchanges can use either existing narrowband connections or can be routed via network adapters (e.g. 46, 58) and the broadband network using either circuit emulation or frame forwarding. The concept is applicable to both fully and quasiassociated signalling schemes. Connections to another mixed mode node are implemented in a similar fashion.

Each trunk network adapter is arranged to have a unique ATM address (NSAP) such that a specific terminal is identified by the Network Service Access Point (NSAP) address of its network adapter, together with the ATM VPINCI that it transmits and receives on, i.e. the Virtual Path Identifier (VPI) and Virtual Channel Identifier (VCI).

As will now be understood, the connection broker clone 44 passes narrowband-to-narrowband requests to the narrowband switching fabric 16, whilst broadband-to-broadband connections (within the same node) are established using proxy signalling to set-up the connection directly. For narrowband-to-broadband connections, two requests are needed; one to the narrowband switching fabric 16 and one to the broadband network edge switches 50, 60–62. However, for a broadband-to-phantom terminal connection, the first connection broker clone passes the connection request to the second connection broker clone (reference numeral 70 of FIG. 3) at the other end of the phantom route. The connection is then made by using a proxy signalling scheme emanating from the second connection broker 70. It should be noted that the present invention envisages that the phantom terminals are implemented as broadband terminals, and so narrowband-to-phantom terminal connection is handled as a combination of a narrowband-to-broadband connection and a broadband-to-phantom terminal connection.

It will also be appreciated that the service inter-working function provided by the present invention is also applicable to networks that have intermediately coupled broadband networks. In this instance, the interconnection between call servers can provide gateway functions, such as billing and screening, while the connection broker clones permit end-to-end connections between the narrowband terminals. Similarly, signalling inter-working functions not otherwise available to respective narrowband networks can be provided by connecting call servers together via the phantom trunks.

In summary, the second connection broker clone recognises two connection requests have been received to the opposite ends of the same phantom trunk, and in response thereto establishes a direct route through the broadband network between the first subscriber terminal 12 and the second subscriber terminal 68.

The present invention therefore advantageously provides a mechanism for the interconnection of mixed nodes through an intermediate broadband network which is otherwise unable to interpret and therefore unable to support the control channel signalling protocols separately utilised within the narrowband networks. Such operation could be supported, for example, by a modified trunk network adapter (of a broadband network) equipped with narrowband signalling software, but generally occurs between different infrastructure exchanges. Consequently, by employing the mechanism of the preferred embodiment to establish a common control channel, the modified trunk network adapter can support a narrowband traffic resource to participate in narrowband services without requiring the intervention of a signalling interworking function.

Beneficially, the combination of phantom trunks and the connection broker clone architecture results in a system implementation that requires no modifications to present narrowband signalling schemes and which supports all narrowband services. Additionally, only minimal changes are required to existing narrowband call servers. Indeed, the present invention provides a system that is scaleable to arbitrarily complex networks and which can operate over any underlying connection fabric including TDM, ATM or Frame Relay.

It will be understood that the above description of a preferred embodiment is given by way of example only and that various modifications may be made by those skilled in the art without departing from the spirit and scope of the invention.

What is claimed is:

1. A method of establishing a narrow band communication channel across a broad band network, from a first terminal associated with a first narrow band network node to a second terminal associated with a second narrow band network node, the broad band network having a signalling protocol dissimilar to that or those provided in the respective narrow band nodes, each said node incorporating a call server having a plurality of substantially identical connection brokers coupled thereto, the method comprising:

at the first narrow band node and on a first communication circuit, receiving an incoming call request from the first terminal, the incoming call request containing an address of the first terminal and a destination address associated with the second terminal;

selecting via a said connection broker at the first node a phantom trunk different from the first communication circuit, the phantom trunk having a circuit identity and being arranged to support a narrow band communication between the first and second nodes;

in a first message, sending the destination address and the circuit identity of the phantom trunk from the first node to the second node;

in a second message, sending the circuit identity and the address of the first terminal to the second node;

identifying via a said connection broker at the second node the presence of the circuit identity in both the first and the second message whereby to establish that the requested communication connection is between the first and second terminals; and establishing the communication connection between the first and second terminals through the broad band network.

2. A method as claimed in claim 1, wherein a said connection broker is selected by sending a request message thereto from the call server associated therewith and receiving a response message from that connection broker to the call server.

3. A method as claimed in claim 2, wherein the selected connection broker is deselected by the call server when said response message is not received within a predetermined time period.

4. A method as claimed in claim 3, wherein the first message contains only part of necessary connection information pertaining to the first terminal and the second terminal.

5. A method as claimed in claim 4, further comprising the step of:

assigning a first phantom terminal at the first narrow band network;

assigning a second phantom terminal at the second narrow band network;

associating the circuit identity of the first message with the second phantom terminal; and associating the circuit identity of the second message with the first phantom terminal.

6. A method as claimed in claim 5, and further comprising the step of establishing a first phantom cross-office path between the first terminal and the first phantom terminal.

7. A method as claimed in claim 6, and further comprising the step of requesting a second phantom cross-office path between the second terminal and the second phantom terminal.

8. A method as claimed in claim 7, and further comprising the step of translating terminal addresses associated with the phantom cross-office paths to provide valid broad band network addresses.

9. A method as claimed in claim 8, wherein the circuit identity includes a circuit indicator code.

10. A method as claimed in claim 9, wherein the step of establishing the communication connection includes the step of, after establishing that the communication connection is between the first terminal and the second terminal, establishing a real connection between the second terminal and the broad band network.

11. A method as claimed in claim 10, and further comprising the step of instructing the first narrow band network node that the real connection between the second terminal and the broad band network has been established.

12. A telecommunications system comprising a broad band network and a plurality of narrow band network each having a respective node interfaced with said broad band network whereby the narrow band networks are interconnected via the broad band network, the broad band network having a signalling protocol dissimilar to that or those provided in the respective narrow band networks, the telecommunications system being arranged to establish a communication connection between a calling communication device in a first said narrow band network and a receiving communication device in a second said narrow band network;

wherein each said narrow band node incorporates a call server having a plurality of substantially identical connection brokers coupled thereto and selection means for means for selecting a said connection broker to orchestrate a said interconnection;

wherein each said call server is responsive to a request message containing the address of the calling communication device and a destination address associated with the receiving communication device so as to identify a circuit identity associated with a first communication circuit used to send the call request to the call server;

wherein each said connection broker is, on selection by the call server, arranged to select a phantom trunk different from the first communication circuit, the phantom trunk having a circuit identity and being arranged to support a narrow band communication between the first and second narrow band networks, the connection broker having means for sending, in a first message, the destination address and the circuit identity from the first narrow band network to the second narrow band network and for sending, in a second message, the circuit identity and the address of the calling communication device to the second narrow band network; and wherein each receiving narrow band node has means for identifying the presence of the circuit identity in both the first and second message to establish that the communication connection is between the calling communication device and the receiving communication device whereby to establish the communication through the broad band network.

13. A narrow band telecommunications network node adapted to interface with a broad band network whereby to communicate with one or more similar narrow band nodes via communications channels established over the broad band network, said narrow band node comprising a call server having a plurality of substantially identical connection brokers coupled thereto and selection means for means for selecting a said connection broker to orchestrate a said interconnection with a similar node;

wherein said call server is responsive to a request message containing the address of the calling communication device and a destination address associated with the receiving communication device so as to identify a circuit identity associated with a first communication circuit used to send the call request to the call server;

wherein each said connection broker is, on selection by the call server, arranged to select a phantom trunk different from the first communication circuit, the phantom trunk having a circuit identity and being arranged to support a narrow band communication between the node and the similar node, the connection broker having means for sending, in a first message, the destination address and the circuit identity from the first narrow band network to the second narrow band network and for sending, in a second message, the circuit identity and the address of the calling communication device to the similar node whereby to establish the communication through the broad band network.

14. A narrow band node as claimed in claim 13, wherein a the connection broker selection means is arranged to send a request message to a said connection broker from the call server associated therewith and receive a response message from that connection broker to the call server indicative of the selection of the connection broker.

15. A narrow band node as claimed in claim 14, wherein the call server has means for deselecting a selected connection broker when said response message is not received within a predetermined time period.

* * * * *